United States Patent
Elledge (10) Patent No.: US 6,304,252 B1
(45) Date of Patent: Oct. 16, 2001

(54) METHODS FOR OPERATING INPUT DEVICES FOR PERSONAL COMPUTER SYSTEMS

(75) Inventor: Dennis D. Elledge, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/241,324

(22) Filed: Feb. 1, 1999

(51) Int. Cl.$^7$ ....................................................... G09G 5/00
(52) U.S. Cl. ............................................. 345/179; 345/163
(58) Field of Search ..................................... 345/156, 157, 345/161, 163, 166, 167, 173, 179, 184

(56) References Cited

U.S. PATENT DOCUMENTS

| | | |
|---|---|---|
| 4,550,316 | 10/1985 | Whetstone et al. . |
| 4,628,755 | 12/1986 | Hawley . |
| 5,589,828 | 12/1996 | Armstrong . |
| 5,771,037 | 6/1998 | Jackson . |
| 5,790,102 | 8/1998 | Nassimi . |
| 5,920,306 | 7/1999 | Kikinis . |
| 5,973,674 | 10/1999 | Buecker . |
| 6,078,312 | * 6/2000 | Liebenow ............................. 345/166 |

OTHER PUBLICATIONS

U.S. application No. 09/245,096, Elledge et al., filed Feb. 2, 1999.

Canter, Sheryl, "Feel Your Software," *PC Magazine Online*, Dec. 1, 1997, pp. 1–2.

\* cited by examiner

*Primary Examiner*—Almis R. Jankus
*Assistant Examiner*—G. F. Cunningham
(74) *Attorney, Agent, or Firm*—Perkins Coie LLP (57) ABSTRACT

Methods for operating hand-held input devices for controlling a visual indicator on a computer system display. In one embodiment, an input device includes a body configured to face a support structure, a projecting member extending between the body and the support structure, and a position sensor operatively connected to the projecting member. The body includes a bottom section configured to move over the support structure and a top section having a contoured surface configured to engage a palm of a hand. The projecting member can have a first portion connected to either the body or the support structure, and a second portion projecting from the first portion toward the other of the body or the support structure. For example, the projecting member can be a rod having a first end pivotally connected to the body and a second end engaged with the support structure such that the second end is inhibited from moving with respect to the support structure. In this embodiment, the position sensor is attached to the body. As the body moves over the support structure, the projecting member moves with respect to the position sensor. The position sensor accordingly detects the relative displacement and velocity of the projecting member, and signals the computer to control the pointer on the display corresponding to the relative movement between the body and the support structure.

22 Claims, 6 Drawing Sheets

METHODS FOR OPERATING INPUT DEVICES FOR PERSONAL COMPUTER SYSTEMS

TECHNICAL FIELD

The present invention is directed toward methods for operating input devices for personal computer systems, including desktop and laptop computer systems.

BACKGROUND OF THE INVENTION

Personal computer systems generally include desktop systems and laptop systems that can operate alone or in network applications. Desktop computer systems typically include a computer processor and a separate display positioned on a desktop, table or other type of support structure. A primary input device, such as a keyboard, is coupled to the processor to allow a user to transmit alphanumeric commands to the processor. Conventional desktop computer systems also generally include at least one secondary input device, such as a mouse, that has a motion detector and one or more input buttons to control a pointer or cursor on the display. For example, the motion detector can be a roller-ball mechanism and the input buttons can include left and right input buttons to click selected areas of the display. In many conventional desktop systems, the roller-ball mechanism is operated on a mouse pad that has a surface area of approximately 40–80 in$^2$.

One drawback with a typical mouse is that it may be inconvenient to use in many desktop applications. More specifically, one problem is that crowded desktops or tabletops may not have sufficient space for operating a full-sized mouse configured to fit the palm of a user because mouse pads occupy a significant amount of surface area. Another problem is that many computer users need to reach away from the keyboard to grasp the mouse. For example, when the keyboard is supported by a pull-out tray that slides underneath the desktop, many computer users need to stretch to reach a mouse supported by the desktop in front of the keyboard. Such stretching for a mouse is not only tiresome, but is also interrupts the operation of the computer. Thus, it may be inconvenient or even uncomfortable to operate conventional full-sized secondary input devices in desktop applications.

Laptop computer systems are generally portable devices that operate from either external or portable power sources. Conventional laptop computer systems typically have a base assembly pivotally connected to a display assembly. The base assembly typically includes the primary input device (e.g., keyboard), and the display assembly typically includes a liquid crystal display (LCD) or another type of display. To access the keyboard and the display, a user positions the base assembly on a surface (e.g., the user's lap or a fixed surface) and pivots the display assembly away from the base assembly. To stow and easily transport the computer after use, the user secures the display assembly to the base assembly in a closed configuration.

As with desktop computer systems, conventional laptop systems also typically include at least one secondary input device to supplement the keyboard. The secondary input device in laptop systems may include a rollerball, touch pad, joystick or other similar device used to manipulate or move images on the display. The secondary input devices in laptop systems may be an integral, permanent component mounted to a central portion of the base assembly adjacent to the keyboard (e.g., joystick or touch pad devices), a detachable component that can be removably detached from an edge of the base assembly, or a separate device that operates apart from the base assembly (e.g. a full-sized mouse).

One drawback of operating joysticks or touch pad systems in laptop systems is that the user may wish to position such devices to one side of the base assembly. For example, the user may wish to manipulate the secondary input device with a particular hand, and thus the user may wish to position the device toward that particular side of the base assembly. A further drawback is that the user may wish to detach the secondary input device from the base assembly to manipulate the device in a position remote from the computer. For example, the user may wish to place the secondary input device on a mouse pad and operate it in a manner similar to the operation of a full-sized mouse for a conventional desktop system. Thus, it is often inconvenient to use secondary input devices that are integral, permanent components mounted to the base assembly of a laptop computer.

In applications that use a full-size mouse with a laptop system, another drawback is that there may not be sufficient space for operating such a secondary input device. Many laptop systems are used in airplanes, buses, cars, trains, or other cramped and crowded situations where there may be a very limited amount of surface area to operate a full-sized mouse. Thus, it is also inconvenient or even highly difficult to use a full-size mouse in such constrained environments where laptop computers are often used.

SUMMARY OF THE INVENTION

The present invention is generally directed toward methods for operating input devices for controlling a pointer or other visual indicator on a display of a computer system. In one embodiment, an input device includes a body configured to face a support structure (e.g., a base assembly of a portable computer, a desktop, a tabletop, etc.), a projecting member extending between the body and the support structure, and a position sensor operatively connected to the projecting member. The body may be a housing including a first section or bottom section configured to move over the support structure, and a second section or top section facing generally away from the support structure. The second section can have a contoured surface extending over the support structure such that the contoured surface is configured to engage a palm of a hand of a user. The body, for example, may be a full-sized mouse housing configured to be gripped by a user.

The projecting member can have a first portion connected to either the body or the support structure, and the projecting member can have a second portion projecting from the first portion toward the other of the body or the support structure. The projecting member, for example, can be a rod having a first end pivotally connected to the body and a second end engaged with the support structure such that the second end is inhibited from moving with respect to the support structure. In this embodiment, the position sensor is attached to the body. As the body moves over the support structure, the projecting member moves with respect to the position sensor corresponding to the relative movement between the body and the support structure. The position sensor accordingly detects the relative displacement and velocity of the projecting member, and the position sensor sends signals to the computer to control the pointer on the display corresponding to the relative movement between the body and the support structure.

DETAILED DESCRIPTION OF THE INVENTION

The following description is directed toward methods for operating secondary input devices for desktop and laptop computer systems. Many specific details of certain embodiments of the invention are set forth in the following description and in FIGS. 1–6 to provide a thorough understanding of these embodiments. For example, an input device in accordance with at least one embodiment of the invention is a full-sized mouse separate from the computer that controls the display pointer or other visual indicator with small movements in a limited, confined space. One skilled in the art, however, will understand that the present invention may have additional embodiments, and that the invention may be practiced without several of the details described in the following description.

Figure 1:
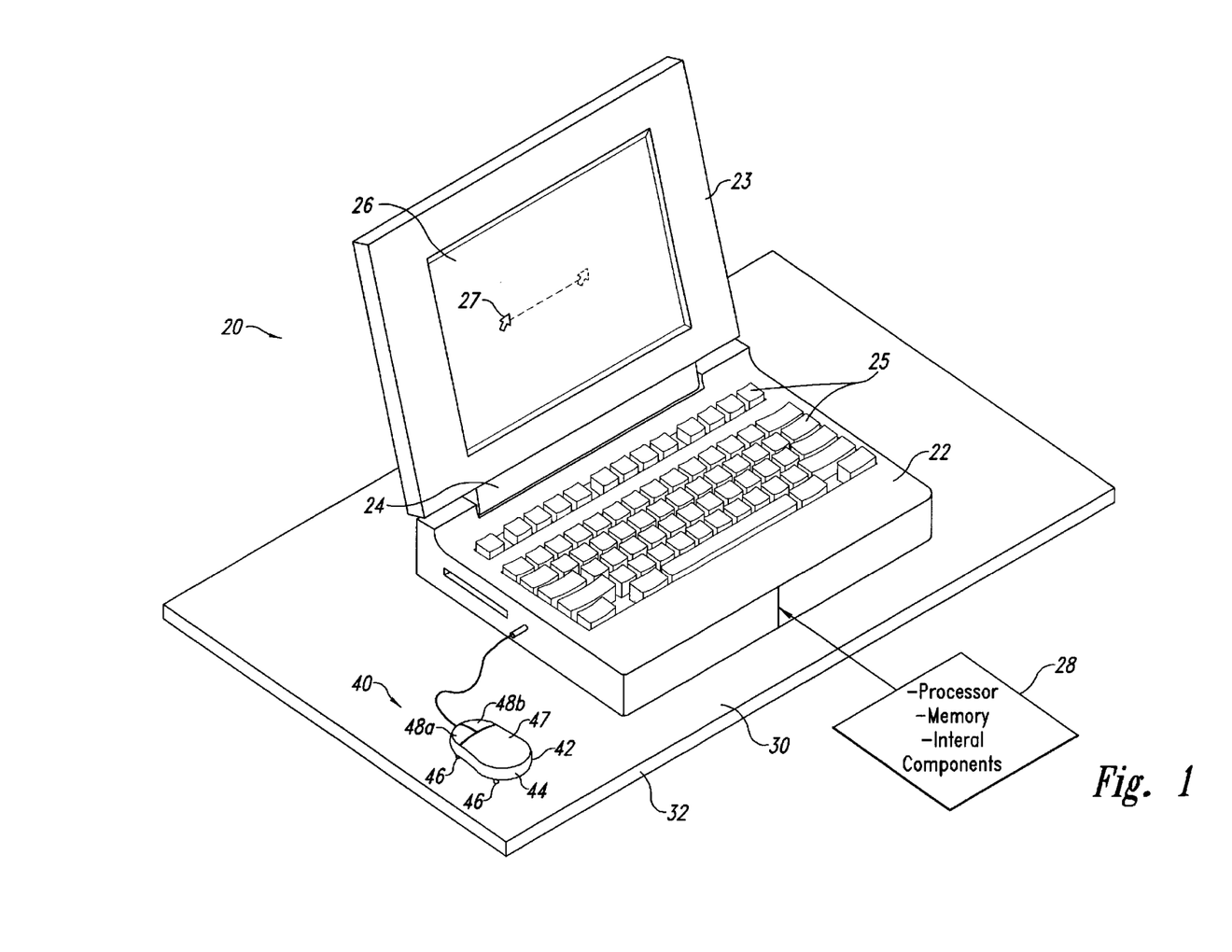
FIG. 1 is a top isometric view of a laptop computer system including an input device used in a method in accordance with an embodiment of the invention.

FIG. 1 is a top isometric view of a laptop computer system 20 having a base assembly 22 coupled to a display assembly 23 by a hinge 24. The base assembly 22 may include a first input device, such as a conventional keyboard 25, a processor, memory devices, and many other components 28 (shown schematically). The display assembly 23 may include a display 26, such as a conventional liquid crystal display (LCD) or a field emission display (FED). When in use, the display assembly 23 is rotated away from the base assembly 22 to an operating configuration (shown in FIG. 1) so that the display 26 and the keyboard 25 are accessible to a user. When the computer system 20 is not in use, the display assembly 23 is secured to the base assembly 22 in a closed or stowed configuration to transport and/or protect the keyboard 25 and the display 26. In operation, the base assembly 22 of the computer 20 can be positioned on a, support structure 30, such as the top surface of a table 32.

Figure 2:
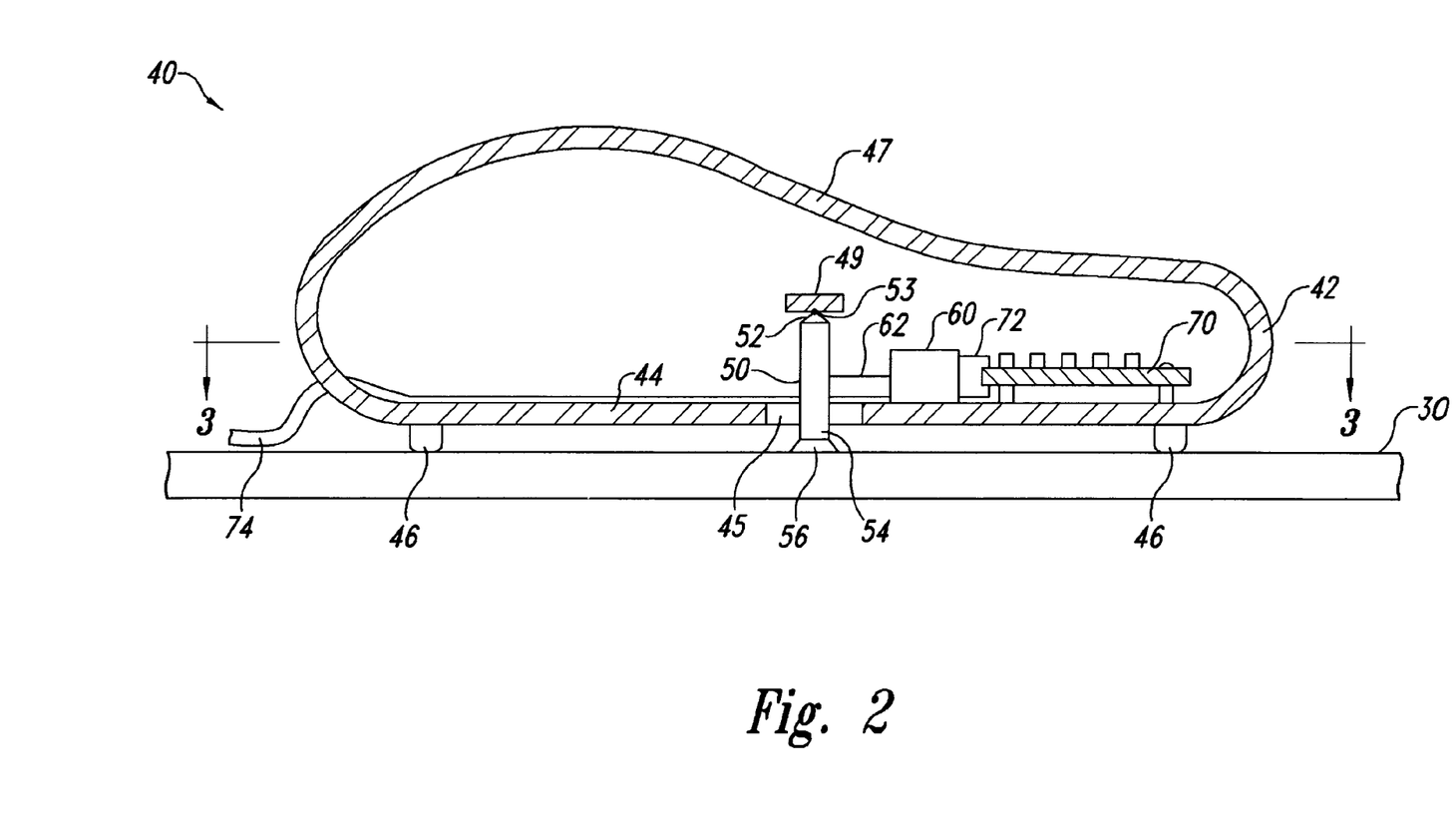
FIG. 2 is a side cross-sectional view of an input device used in a method in accordance with an embodiment of the invention in which certain components are shown schematically.

FIG. 1 also illustrates a secondary input device 40 in accordance with an embodiment of the invention, and FIG. 2 is a side cross-sectional view showing this embodiment of the secondary input device 40 in greater detail and certain components schematically. In this embodiment, the secondary input device 40 includes a body or housing 42, a projecting member 50, and a position sensor 60. The secondary input device 40 can be shaped like a full-sized mouse, yet, as explained below, the secondary input device 40 can operate in a small confined area.

The housing 42 shown in FIG. 1 is a hand-sized body that can include a bottom section or first section 44 configured to face the support structure 30. The first section 44 in this embodiment, for example, is a bottom panel that includes an opening 45 through which the projecting member 50 passes, and a plurality of feet 46 depend from the housing 42 to space the opening 45 apart from the support structure 30. The feet 46 can be rounded to allow the housing 42 to slide across the support structure 30. The housing 42 can further include a second section or top section 47 over the first section 44. The second section 47, for example, can be a top panel having a contoured surface extending over the support structure 30 to conform to or otherwise engage a palm of a hand of a user. In one application, the second section 47 has a surface area from approximately 4 in$^2$ to 20 in$^2$. The housing 42 can also include first and second control buttons 48a and 48b (FIG. 1), and an internal cross-beam 49 extending across an internal portion of the housing 42 above the first section 44.

The projecting member 50 of the secondary input device 40 extends between the housing 42 and the support structure 30. In this particular embodiment, the projecting member 50 is a pivoting rod that has a first portion or first end 52 pivotally connected to the cross-beam 49 of the housing 42 and a second portion or second end 54 projecting from the first portion 52 toward the support structure 30. The first end 52 can be pivotally connected to the cross-beam 49 by a ball joint 53. The projecting member 50 can further include a connecting element or gripping element 56 attached to the second portion 54 to prevent the second portion 54 of the projecting member 50 from sliding with respect to the support structure 30. The gripping element 56 can be a high friction pad, such as a soft rubber or elastomeric tip at the end of the second section 54. One particularly suitable elastomeric material is Kraton® manufactured by Shell Oil Corporation. The gripping element 56 can also be a suction cup that holds the second portion 54 of the projecting member 50 to the support structure 30 with a vacuum. In operation, the gripping element 56 holds the second portion 54 to the support structure 30 such that relative motion between the housing 42 and the support structure 30 causes the projecting member 50 to pivot with respect to the cross-beam 49.

The projecting member 50 is operatively coupled to a position sensor 60 in the housing 42 by a coupling device 62, such as a link or arm. The position sensor 60 may have one or more individual devices that detect the displacement of the projecting member 50 with respect to the housing 42 to determine the relative displacement and velocity between the projecting member 50 and the housing 42. The position sensor 60 can also include circuitry 70 to generate and send signals to the computer 20 via a transmission line 74 that moves a cursor or other pointer 27 across the display 26 (FIG. 1). Suitable position sensors 60 are known in the art of designing and manufacturing joysticks.

Figure 3:
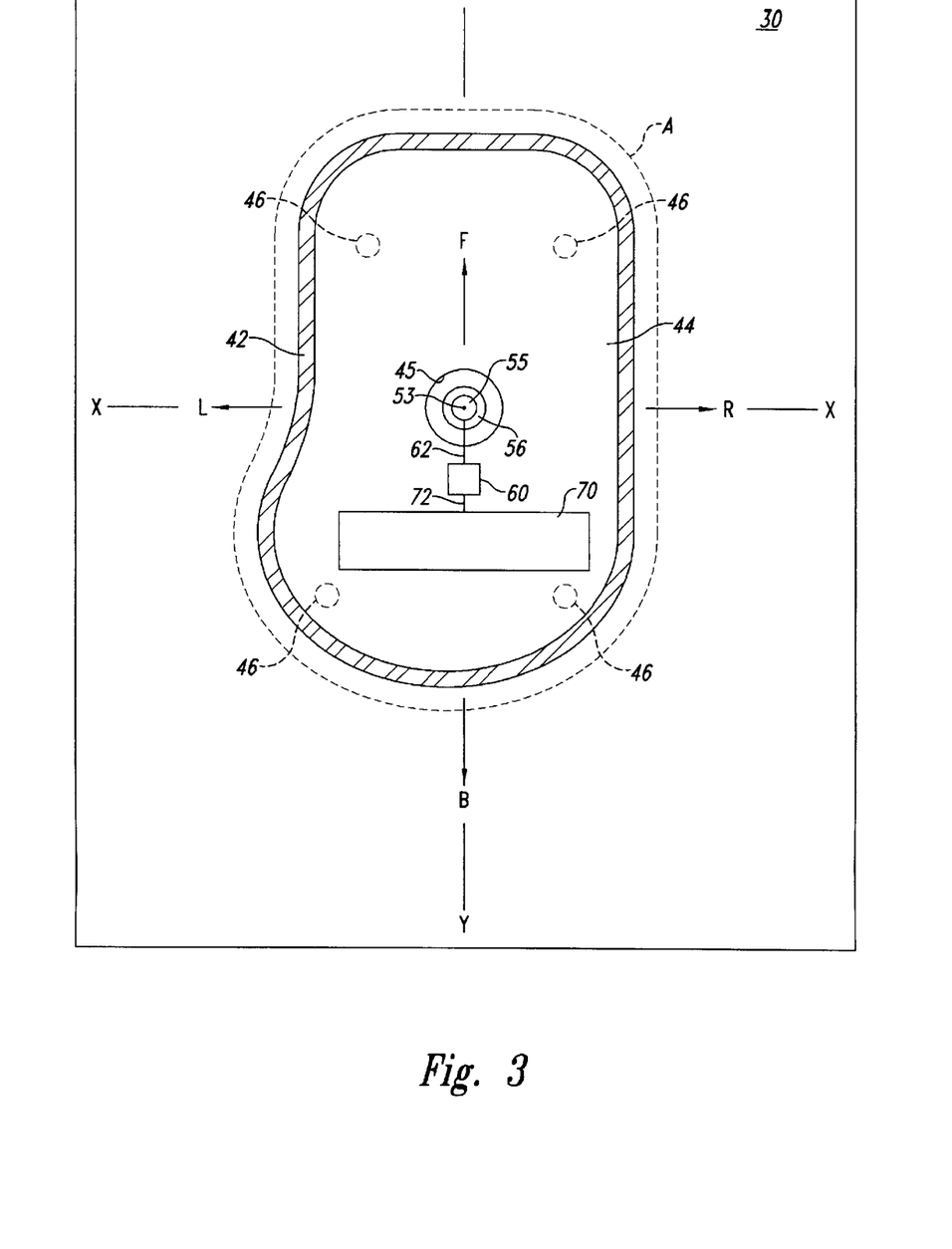
FIG. 3 is a top cross-sectional view of the input device of FIG. 2 taken along plane 3—3 in which certain components are shown schematically.

FIG. 3 is a top cross-sectional view taken along plane 3—3 of the secondary input device 40 shown in FIG. 2 in which certain components are shown schematically. A user operates the input device 40 by moving the housing 42 with respect to the support structure 30 in forward F, backward B, left L and/or right R directions, or any combination thereof, to move the pointer 27 across the display 26. As the user moves the housing 42, the projecting member 50 pivots about the ball joint 53 because the gripping element 56 secures the second portion 54 of the projecting member 50 to the support structure 30. The movement of the projecting member 50 accordingly corresponds to the relative movement between the housing 42 and the support structure 30. The position sensor 60 detects the relative displacement between the projecting member 50 and the housing 42, and the position sensor 60 sends a signal to the computer 20 (FIG. 1). In general, the position sensor detects the relative movement between the housing 42 and the support structure 30 with respect to coordinates along X and Y axes.

One aspect of operating the secondary input device 40 is that the gripping element 56 causes the projecting member 50 to pivot so that only a small movement of the housing 42 moves the pointer 27 on the display 26 of the computer 20. The movement of the secondary input device 40, more particularly, is limited to the pivotal displacement of the projecting member 50 such that the pointer 27 can be moved to any location on the display 26 by moving the secondary input device 40 within a relatively limited area A on the support structure 30. In one particular embodiment, the pivotal displacement of the projecting member 50 is restricted to restrict the movement of the housing 42 with respect to the support structure 30 to a maximum displacement of 0.25 inch from a center position defined by the intersection of the X-Y axes. The secondary input device 40 can accordingly provide fall control of the pointer 27 without occupying a significant amount of surface area on a desktop or other surface. Moreover, unlike conventional joysticks, the secondary input device 40 also provides a full-sized mouse with control buttons that can be easily manipulated by a user separate from the base assembly 22 (FIG. 1) of the computer 20. Therefore, the secondary input device 40 is expected to be well-suited for use with laptop computers and desktop computers in applications in which there is only a limited area to operate the secondary input device.

Figure 4:
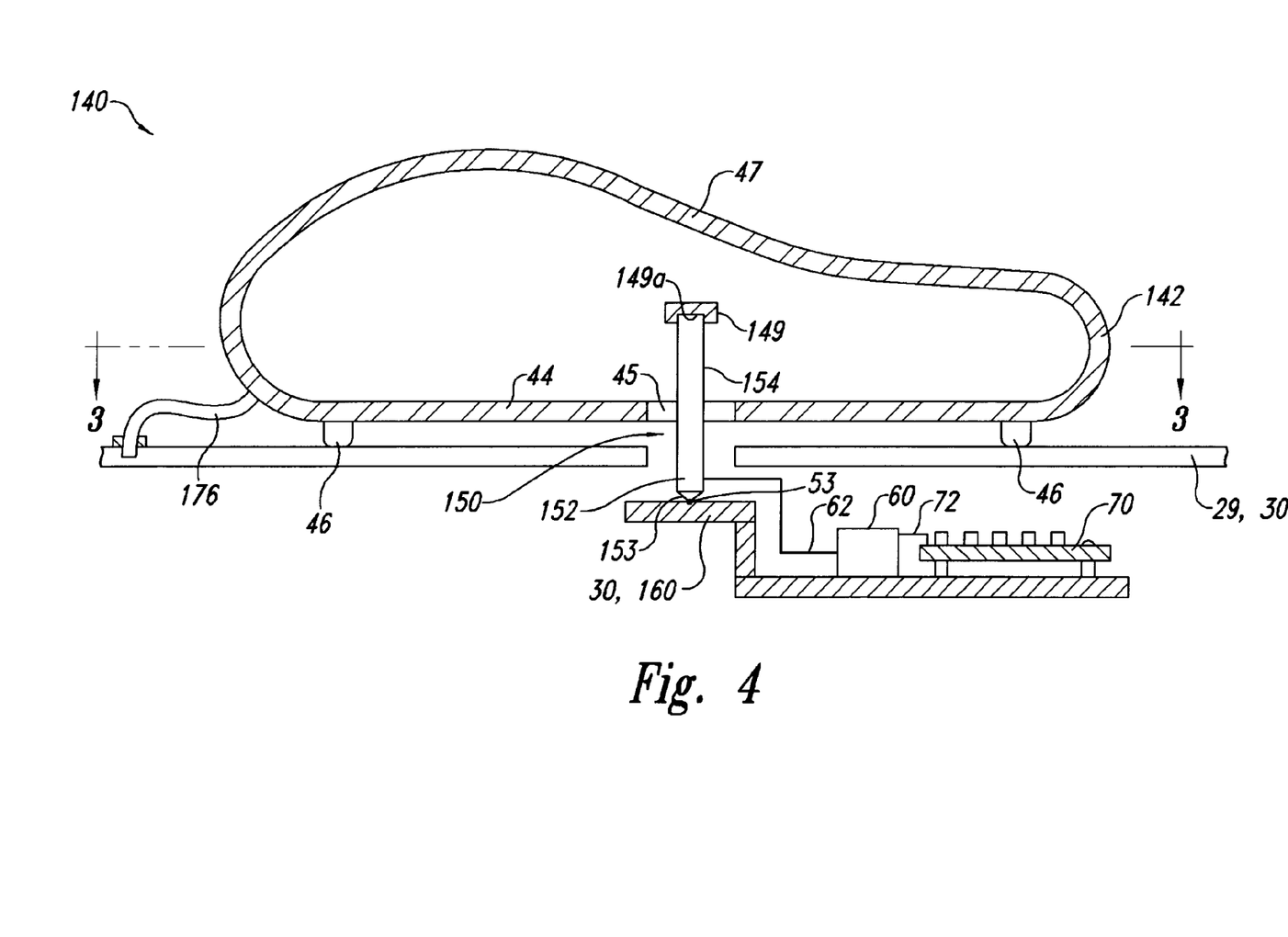
FIG. 4 is a side cross-sectional view of an input device used in a method in accordance with an embodiment of the invention in which certain components are shown schematically.
Figure 5:
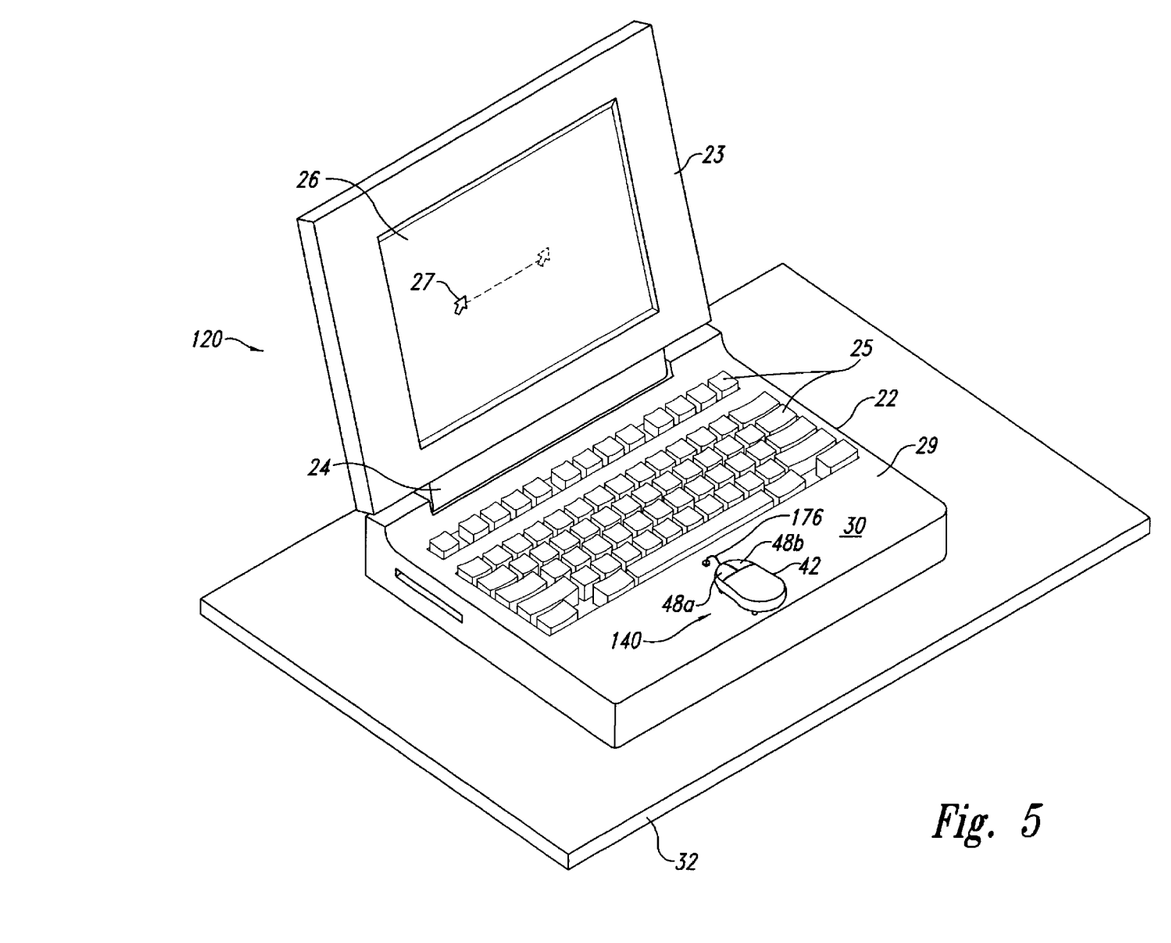
FIG. 5 is a top isometric view of a laptop computer with the input device of FIG. 4.

FIG. 4 is a cross-sectional view in which certain components are shown schematically and FIG. 5 is a top isometric view of a computer 120 with a secondary input device 140 attached to a base assembly 122 in accordance with another embodiment of the invention. To simplify the present description, like reference numbers refer to like components in FIGS. 1–5. The support structure 30 of this embodiment can be an upper panel 29 of the base assembly 122, or a shelf or flange 160 in the base assembly 122. In this embodiment, the secondary input device 140 has a housing 142 with a first section 144 configured to move over the support structure 30 and a second section 47 configured to be gripped by a user. The housing 142 also has a cross-beam 149 with a hole 149a.

The secondary input device 140 can further include a projecting member 150 and a position sensor 60 in the base assembly 122 of the computer 120. In this embodiment, the projecting member 150 is a pivoting joystick having a first section 152 pivotally coupled to the shelf 160 via a ball joint 153 and a second section 154 projecting away from the base assembly 122. The projecting member 150 passes through the opening 45 in the housing 142 and into the hole 149a of the cross-beam 149. The projecting member 150 is preferably removably received in the hole 149a so that the housing 142 can be detached from the projecting member 150. In this particular embodiment, the projecting member 150 and the position sensor 60 can be similar to a joystick in a laptop computer. The secondary input device 140 can further include a separate transmission line 176 to separately couple the control buttons 48a and 48b to the computer 120.

In operation, the secondary input device 140 is moved over the support structure 30 to position the pointer 27 on the display 26 in much the same manner that a joystick is operated. The secondary input device 140, however, allows the user to operate the joystick system with the feel of a full-sized mouse because the housing 142 is configured to fit the palm of a user and the control buttons 48a and 48b are components of the housing 142. The secondary input device 140 can thus be manipulated to both position the pointer 27 on the display 26 and operate the control buttons 48a and 48b with a single hand. The housing 142 and the transmission line 176 can also be disconnected from the base assembly 122 and placed in a carrying case along with the computer 120 to close the display assembly 23 for storing or transporting the computer 120.

Figure 6:
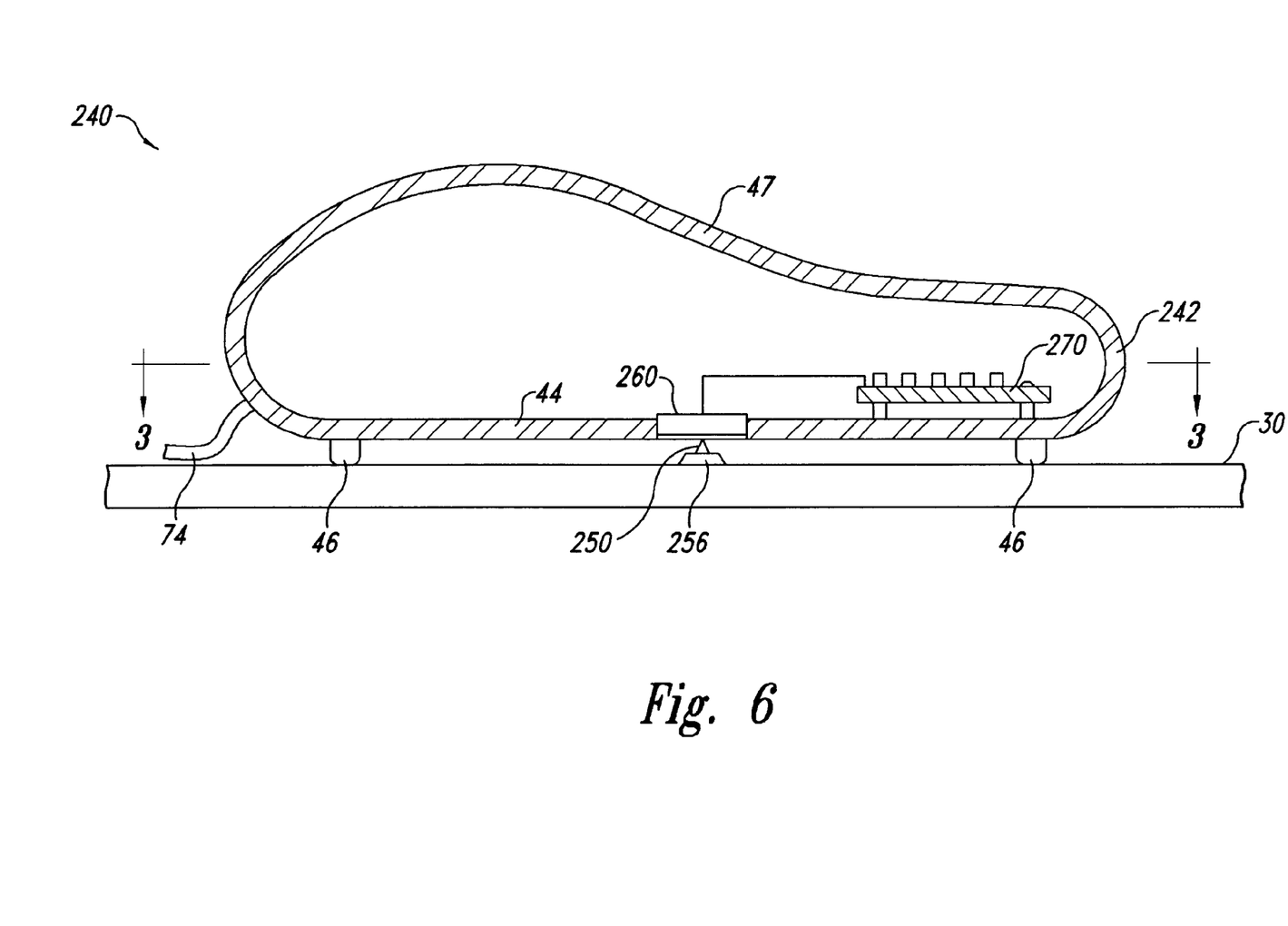
FIG. 6 is a side cross-sectional view of yet another input device used in a method in accordance with yet another embodiment of the invention in which certain components are shown schematically.

FIG. 6 is a cross-sectional view of a secondary input device 240 in which certain components are shown schematically in accordance with yet another embodiment of the invention. In this embodiment, the secondary input device 240 has a housing 242, a projecting member 250 attached to the support structure 30, and a position sensor 260 attached to the first section 44 of the housing 252. The projecting member 250 can be stylus having a foundation or gripping element 256 that is removably attached to the support structure 30. The gripping element 256, for example, can be a suction cup or a high-friction member. The stylus can also have a tip projecting from the gripping element. The projecting member 250 can also be a fixed protuberance projecting from the support structure 30. The position sensor 260 in this embodiment is a touch pad similar to a touch pad in a conventional laptop computer that controls the position of the pointer 27 on the display 26 according to the contact point on the position sensor 260. In operation, the position sensor 260 senses the position of the projecting member 250 on the face of the position sensor 260 to detect relative movement between the housing 242 and the support structure 30. The position sensor 260 also generates signals to control the position of the visual indicator 27 on the display 26. In another embodiment (not shown), the position sensor 260 can be in the support structure 30 and the projecting member 250 can depend from the first section 44 of the housing 242.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. In a computer system, a method of operating an input device over a support structure, the input device including a body configured to be engaged with a palm of a hand of a user, a projecting member having a first end moveably attached to one of the body or the support structure and a second end projecting from the first end toward the other of the body or the support structure, and a position sensor operatively coupled to the projecting member, the method comprising:

removably attaching the second end of the projecting member with the other of the body or the support structure to which the first end of the projecting member is not attached to prevent the second end from sliding across the other of the body or the support structure;

moving the body with respect to the support structure, the projecting member moving with respect to the body in correspondence to the relative motion between the body and die support structure;

detecting the relative movement between the projecting member and the body; and controlling a pointer on a display of the computer system according to the detected relative movement between the projecting member and the body.

2. The method of claim 1 wherein:

the projecting member comprises a rod having a first end pivotally attached to the body, a second end projecting from the body toward the support structure, and a gripping element attached to the second end of the rod;

the position sensor is mounted to the body; and removably attaching the projecting member with the other of the body or the support structure comprises engaging the gripping element with the support structure.

3. The method of claim 2 wherein:

the gripping element comprises a high friction pad; and engaging the gripping element with the support structure comprises pressing the high Diction pad against the support structure.

4. The method of claim 2 wherein:

the gripping element comprises a suction cup; and engaging the gripping element with the support structure comprises pressing the suction cup against the support surface to draw a vacuum in the suction cup.

5. The method of claim 1 wherein:

the projecting member comprises a stick having a first end pivotally attached to the support structure and a second end projecting from the support structure toward the body;

the position sensor is mounted to the support structure;

removably attaching the projecting member with the other of the body or the support structure comprises removably inserting the second end of the stick into a hole in a bottom section of the body; and controlling a pointer on the display further comprises pressing a control button on the body.

6. The method of claim 1 wherein:

the body comprises a housing including a bottom section having an opening, a top section facing away from the support structure to engage a palm of a hand of a user, and a cross-beam extending through at least a portion of the housing over the bottom section, the cross-beam being aligned with the opening;

the projecting member comprises a rod passing through the opening in the bottom section of the housing, the rod having a first end pivotally attached to the cross-beam in the housing, a second end projecting from the housing toward the support structure, and a gripping element attached to the second end of the rod to engage the support structure;

the position sensor is attached to the housing; and removably attaching the projecting member with the other of the body or the support structure comprises engaging the gripping element with the support structure.

7. The method of claim 6 wherein:

the gripping element comprises a high friction pad; and engaging the gripping element with the support structure comprises pressing the high friction pad against the support structure.

8. The method of claim 6 wherein:

the gripping element comprises a suction cup; and engaging the gripping element with the support structure comprises pressing the suction cup against the support surface to draw a vacuum in the suction cup.

9. The method of claim 1 wherein:

the body comprises a housing including a bottom section and a top section facing away from the bottom section, the top section being configured to engage a palm of a hand of a user;

the position sensor comprises a touch pad attached to the bottom section of the housing;

the projecting member comprises a stylus having a foundation attachable to the support structure to inhibit the stylus from moving win respect to the support structure and a tip projecting from the foundation to engage the touch pad; and removably attaching the projecting member with the other of the body or the support structure comprises engaging the tip of the stylus win the touch pad in the body.

10. The method of claim 9 wherein detecting the relative movement between the projecting member and the body comprises sensing the movement of the tip of the stylus on the touch pad and generating signals corresponding to the location of the sensed movement of the tip of the stylus across the touch pad.

11. The method of claim 1 wherein:

the body comprises a housing including a bottom section and a top section facing away from the bottom section, the top section being configured to engage a palm of a hand of a user;

the position sensor comprises a touch pad attached to the support structure;

the projecting member comprises a stylus having a foundation attached to the bottom section of the housing and a tip projecting from the foundation to engage the touch pad in the support structure; and removably attaching the projecting member with the other of the body or the support structure comprises engaging the tip of the stylus with the touch pad in the support structure.

12. The method of claim 11 wherein detecting the relative movement between the projecting member and the body comprises sensing the movement of the tip of the stylus on the touch pad and generating signals corresponding to the location of the sensed movement of the tip of the stylus across the touch pad.

13. The method of claim 1 wherein detecting the relative movement between the projecting member and the body comprises pivoting the projecting member win respect to the body and sensing the relative pivotal movement between the projecting member and the body.

14. The method of claim 13 wherein pivoting the projecting member with respect to the body comprises limiting the pivotal movement to restrict the movement of the body with respect to the support structure to a maximum displacement from a center position of 0.25 inch, the pointer being positionable at any location on the display by the pivotal movement of the projecting member.

15. In a computer system, a method of operating an input device over a support structure, comprising:

providing a body contoured for a palm of a hand of a user and a projecting member having one end coupled to the body;

inhibiting another end of the projecting member of the input device from moving with respect to a support structure upon which the body of the input device is positioned;

moving a portion of the projecting member with respect to the body corresponding to relative movement between the body and the support structure; and controlling a pointer on a display of the computer system according to the relative movement between the projecting member and the body.

16. In a computer system, a method of operating an input device over a support structure, comprising:

inhibiting an end of a projecting member of the input device from moving with respect to a support structure upon which a body of the input device is positioned by engaging a gripping element attached to the projecting member with the support structure, the gripping element inhibiting the one end of the projecting member from sliding across the support structure;

moving a portion of the projecting member with respect to the body corresponding to relative movement between the body and the support structure; and controlling a pointer on a display of the computer system according to the relative movement between the projecting member and the body.

17. The method of claim 16 wherein:

the gripping element comprises a high friction pad; and engaging the gripping element with the support structure comprises pressing the high friction pad against the support structure.

18. The method of claim 16 wherein:

the gripping element comprises a suction cup; and engaging the gripping element with the support structure comprises pressing the suction cup against the support structure to draw a vacuum in the suction cup.

19. The method of claim 15 wherein moving the other end of the projecting member with respect to the body comprises pivoting the projecting member with respect to the body corresponding to relative motion between the body and the support structure.

20. The method of claim 19 wherein controlling the pointer comprises detecting pivotal displacement between the body and the projecting element and generating signals corresponding to the detected movement of the projecting member that provide data to move the pointer across the display.

21. In a computer system, a method of operating an input device over a support structure comprising:

inhibiting an end of a projecting member of the input device from moving with respect to a support structure upon which a body of the input device is positioned, the body including a touch pad position sensor attached to a bottom panel of the body to face the support structure, the projecting member comprising a stylus having a foundation attached to the support structure and a tip projecting from the foundation to engage the touch pad attached to the body;

sliding the tip of the stylus across the touch pad by moving the body with respect to the support structure; and controlling a pointer on a display of the computer system according to the relative movement between the projecting member and the body.

22. The method of claim 21 wherein controlling the pointer comprises detecting the movement of the tip of the stylus across the touch pad and generating signals corresponding to the detected movement of the stylus that provide data to move the pointer across the display.

* * * * *

UNITED STATES PATENT AND TRADEMARK OFFICE
CERTIFICATE OF CORRECTION

PATENT NO. : 6,304,252 B1
DATED : October 16, 2001
INVENTOR(S) : Elledge

It is certified that error appears in the above-identified patent and that said Letters Patent is hereby corrected as shown below:

Title page, Item [54] and Column 1, line 1,
The title should be -- METHODS FOR OPERATING HAND-HELD DEVICES FOR PERSONAL COMPUTER SYSTEMS --;

Column 5,
Line 18, "fall" should be -- full --;

Signed and Sealed this

Twenty-fourth Day of September, 2002

Attest:

Attesting Officer

JAMES E. ROGAN
Director of the United States Patent and Trademark Office